Luther G. Simjian
INVENTOR.

BY Ervin B. Steinberg

AGENT.

July 16, 1968 L. G. SIMJIAN 3,393,270

COMMUNICATION SYSTEM EMPLOYING CHARACTER COMPARISON AND CODE TRANSLATION

Filed Oct. 28, 1964 2 Sheets-Sheet 2

Luther G. Simjian
INVENTOR.

BY Ervin B. Steinberg

AGENT.

United States Patent Office 3,393,270

Patented July 16, 1968

3,393,270

COMMUNICATION SYSTEM EMPLOYING CHARACTER COMPARISON AND CODE TRANSLATION

Luther G. Simjian, Laurel Lane, Greenwich, Conn. 06830

Filed Oct. 28, 1964, Ser. No. 407,176
6 Claims. (Cl. 178—26)

ABSTRACT OF THE DISCLOSURE

A message transmission system receives at a message generation station units of language disposed on a recording medium. The units of language are sensed by sensing means and fed to a storage means which provides a code responsive to each unit of language. The code so obtained is recorded and transmitted to a message receiving station. At the message receiving station, the transmitted code is re-converted by a corresponding arrangement to units of language and applied upon a recording medium. The code acts as a common denominator between the units of language provided at the message generation station and regenerated at the message receiving station.

This invention refers to a communication system and has particular reference to a system for exchanging written messages between two physically separated stations. More specifically, this invention concerns a method and apparatus for automatically converting a written or printed language message to a code at the message generation station, and for reconverting this code message to printed language at the message receiving station.

While there have been devised various written message transmission means, such as telegraphic or telephonic data exchanges, using variations or adaptations of the Morse code, or modulated audio signals, relatively little effort has been expended to provide an inexpensive, automatic coding and decoding system at the message transmitting and receiving terminals. Additionally, as is well known, it is highly desirable to transmit messages at high speed and in an abbreviated form in order to provide for the effective utilization of existing transmission facilities in the face of an ever increasing message volume.

I have directed, therefore, my attention to the provision of a relatively inexpensive means for automatically coding and decoding written messages and for using for transmission a code which is shorter than the average written word, thus providing a communication transmission system which is characterized by a favorable utilization factor of presently existing transmission facilities. To this end, the message generation and message receiving stations include substantially identical storage means, each such storage means comprising a first storage section which contains units of language and a second section which contains sets of code, each such set of code being associated with a respective unit of language. Additionally, there are provided sensing means for sensing the respective first and second sections, for sensing respectively the message to be transmitted and the message received, coincidence means, control means, and recording means for respectively recording the language type message in code form and for decoding the transmitted message in response to the existence of predetermined concurrence conditions.

One of the principal objects of this invention, therefore, is the provision of a communicaiton system which is characterized by certain advantages over existing systems when considering such factors as complexity and cost.

Another object of this invention is the provision of a communication system which includes relatively simple and inexpensive means for obtaining message coding at the message generation station and for restoring the transmitted message at the message receiving station.

A further object of this invention is the provision of a relatively simple means for converting written units of language to coded data and for reconverting the transmitted coded data to written units of language.

A still further object of this invention is the provision of storage and sensing means so arranged and in cooperative relationship with one another as to provide automatic coding and decoding of data upon the sensing means establishing the concurrence of predetermined data.

Further and still other objects of this invention will be more clearly apparent by reference to the following descritpion when taken in conjunction with the accompanying drawings in which.

Figure 1:
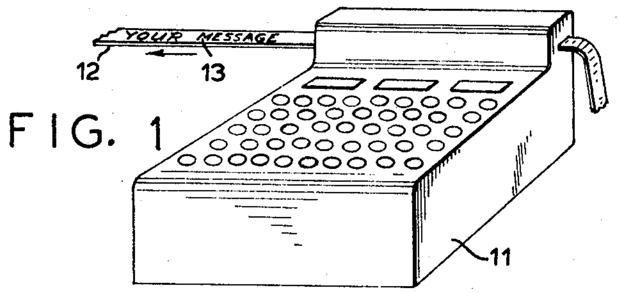
FIGURE 1 is a schematic illustration of the message writing apparatus.

Referring now to the figures and FIGURE 1 in particular, numeral 11 refers to a typewriter-like machine for typing out a message 13 on a tape 12, the latter constituting a storage medium. This storage medium, subsequently, is used in the message generation station. It may be noted that the message 13 comprises printed characters in the form of words. Obviously, abbreviated words or phonetically spelled words, for instance, could be substituted without the words or meaning of the message becoming unintelligible. The words or partial words of language have been termed herein "units" of language in order to differentiate the language type communication from a code type communication which is used for transmitting the message from the generation station to the receiving station.

Figure 2:
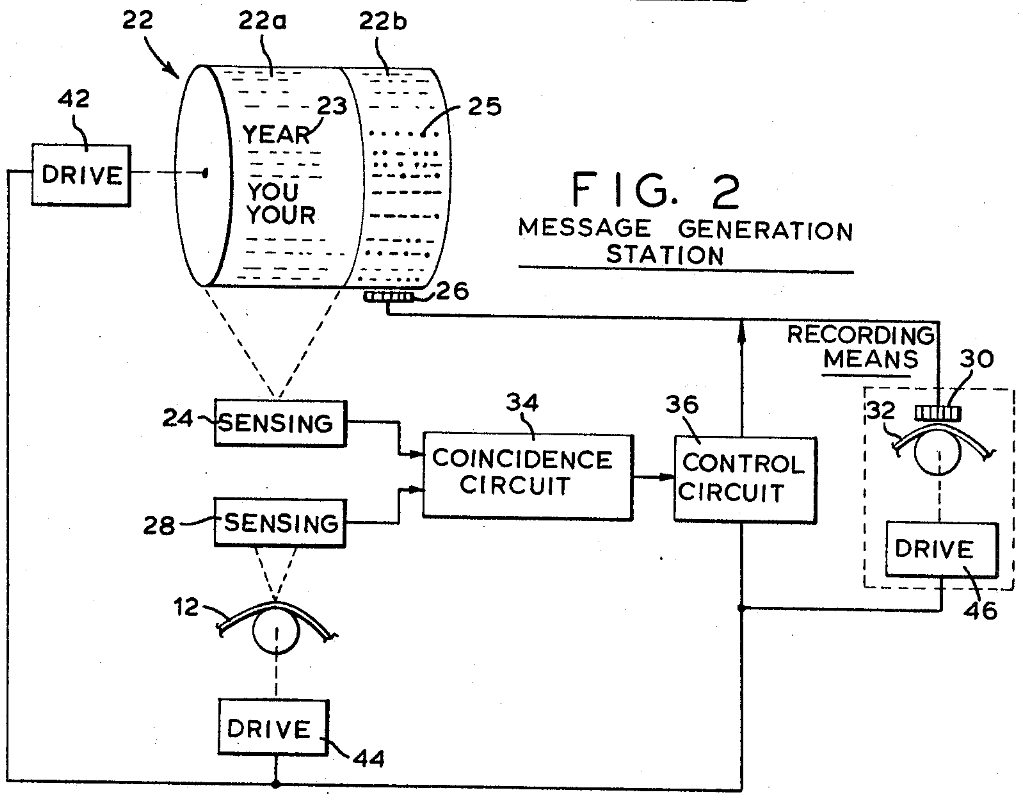
FIGURE 2 is a schematic block diagram of the message generation station.

The main components of the message generation station are indicated in FIGURE 2 and include a first storage means 22; a first and a second sensing means, 24 and 26 respectively, associated with said first storage means; a second storage means 12 containing the previously prepared message; a third sensing means 28 for reading the message on the storage means 12; a recording means 30 for recording a coded message on a third storage means 32; a coincidence circuit 34, and a control circuit 36.

The first storage means 22 may take the form of a drum or cylinder or, alternatively, may comprise a stack of parallel and concentric disks similar to a conventional digital computer random access memory. Still further, it may be constructed in the form of a continuous loop. Irrespective of the particular configuration, however, this storage means has two sections, a first section 22*a* having units of language and a second section 22*b* having code characters or sets of code.

It is known that one thousand common words of the English language, for instance, are sufficient to provide intelligible communication. Thus, there are provided in this preferred example about 1,000 words or units of language in printed form in section 22*a*, while in section 22*b* code data have been assigned to each such unit. For instance, eleven binary digits provide up to 1,024 combinations. Obviously, other suitable code means may be used. In the preferred embodiment, the section 22b is a magnetic recording medium having the code data stored thereon magnetically. It will be apparent, however, that the code data could be also in other forms, such as perforated data, imprinted data, and so forth. Thus, for each unit of language in section 22a, as for instance the word "YEAR" numeral 23, there is associated therewith a set of code characters, such as the specific set of code data identified by numeral 25. The code characters may be in juxtaposed position as shown, shifted by a predetermined amount, or otherwise disposed relative to the units of language, as long as the mutual association is completely predetermined and, hence, identifiable. Another set of code data applies to the word "YOU." The first storage means is designed to contain the desired quantity of units of language and the respectively associated code sets.

The second storage means 12 has been provided with units of language by means of machine 11, FIGURE 1, and therefore, for each unit of language on the second storage means, tape 12, there should exist a corresponding unit of language in section 22a. The sensing means 24 and 28 sense respectively the section 22a and the tape 12, and when concurrence of the respective data (units of language) is sensed, a signal is sent by the coincidence circuit 34. This circuit is connected to the control circuit 36 which causes the recording means 30 to record onto the storage means 32 the code data sensed by the sensing means 26, which data at this particular instant are those corresponding to the units of language sensed by the sensing means 28 on tape 12 and converted to code by means of the intermediate step of storage section 22a.

The sensing means 24 and 28 may take many forms as the art of automatically reading printed or handwritten characters has been extremely well developed, reference being made in this connection to the article: "Optical Character-Recognition Systems" by Howard Falk, Electro-Technology magazine, Conover-Mast Publication, July 1964, pages 42–52 and 160, and the rather comprehensive bibliography listed therein. While I do not wish to be limited to a particular method of reading printed units of language, I believe that the matching of units using the positive and negative transparency technique is particularly suited. In order to accomplish this method, the units of language on the first storage means 22a and those on the second storage means 12 will be arranged as positive and negative transparencies respectively, coincidence of data being achieved and determined when there is a substantial match. This matching technique is described and illustrated, for instance, in U.S. Patents No. 2,964,641 dated Dec. 13, 1960, issued to P. J. Selgin, and No. 2,827,822 dated Mar. 25, 1958, issued to R. L. Timms. In view of the fact that this recognition technique is known to those skilled in the art and as other optical reading techniques and systems may be used as well, the reading of the units of language is not illustrated beyond the block diagram presentation.

The drive means 42, 44 and 46, all controlled from the control circuit 36, provide motion respectively to the first storage means, drum 22, to the second storage means, tape 12, and to the recording means, the third storage means 32. According to the preferred embodiment, the drum rotates continuously relative to the sensing means 24 and 26; the tape 12 and tape 32 advance step by step relative to the sensing means 28 and the recording means 30 respectively, in response to a signal from the coincidence circuit 34, this signal being provided subsequent to the transfer of the code data from the drum section 22b to the storage means 32.

The storage means 32 may comprise a magnetic tape, a perforated tape or any other suitable and known data storage medium, the associated recording means 30 being selected to provide the proper transfer of data thereupon.

Figure 3:
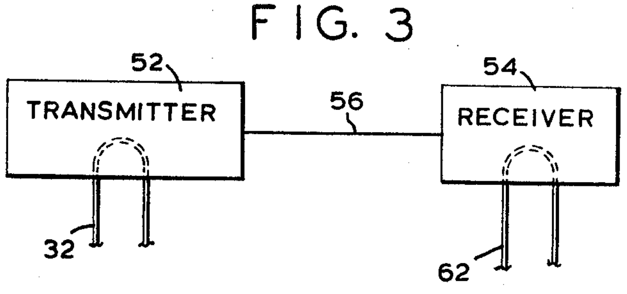
FIGURE 3 is a schematic block diagram of the message transmission facilities.

FIGURE 3 indicates the transmission of the code data from the storage means 32 via a transmitter 52, a communication link 56, to a receiver 54 and to a further storage means 62. As is well known to those skilled in the art, the transmission of data takes place at a very high speed and may be accomplished by wire or wireless methods. It should be noted that by means of the above described method, words and sentences have been reduced to simple code data which can be transmitted at a rapid pace and with a minimum of equipment, thus making maximum use of existing transmission facilities.

Figure 4:
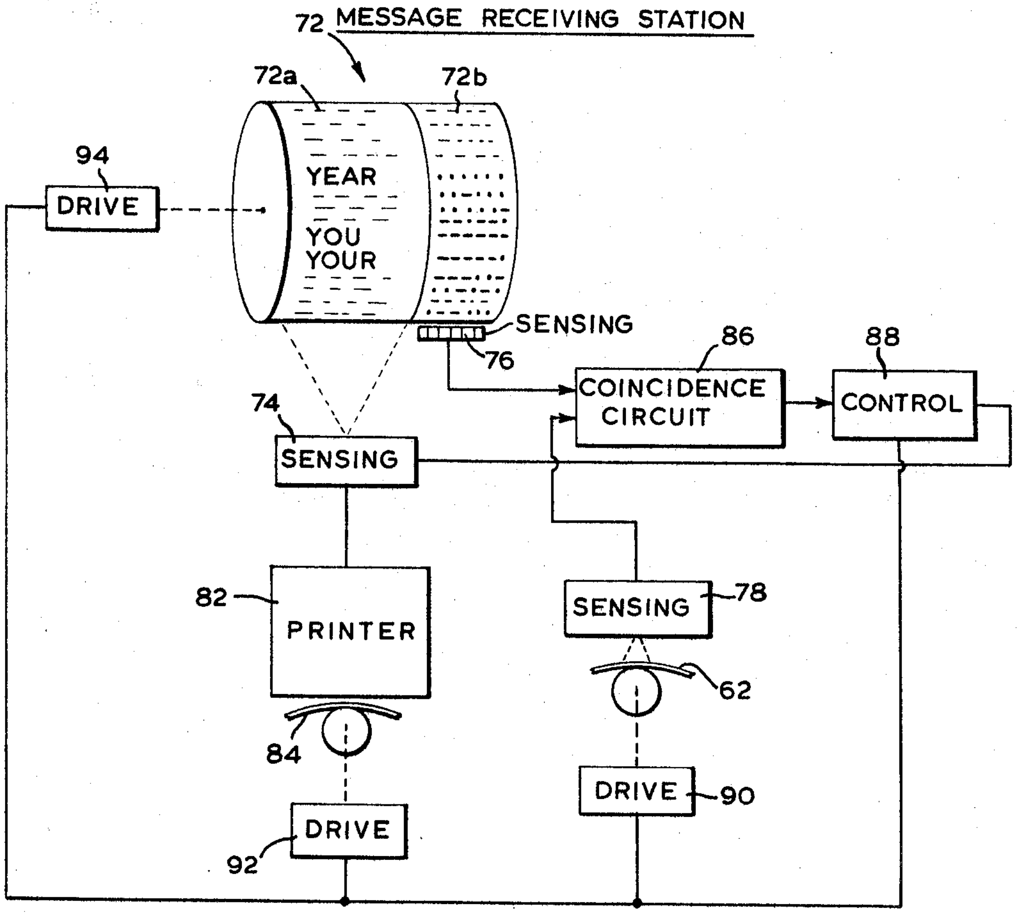
FIGURE 4 is a schematic block diagram of the message receiving station.

The message receiving station and the message reproducing or regeneration method is indicated in FIGURE 4. This station includes a further first storage means, drum 72; two sensing means 74 and 76 which are adapted to communicate respectively with the two sections 72a and 72b of the drum; a sensing means 78 adapted to read the transmitted message provided by the storage means 62; a printer 82; a storage means 84 on which the transmitted message is reproduced in units of language; a coincidence circuit 86; a control means 88; and drive means 90, 92 and 94. The storage drum 72 in FIGURE 4 is substantially a replica of the storage means 22 in FIGURE 1, also having a first section 72a which contains the units or words of language and a second section 72b which contains the sets of code data pertaining to the units of language.

The message transmitted and received on storage means 62 is supplied to a reading device which includes the drive means 90 and the sensing means 78. As the sensing means 78 reads the received code data, sensing means 76 scans the code data on section 72b of the storage drum 72. Concurrence of the data provides a signal in the coincidence circuit 86 which, in turn, actuates the control means 88. In response to the condition of concurrence, the sensing means 74 is actuated by the control means 88 to read the corresponding unit of language on section 72a of the drum 72 and transfer the information to the printer 82 which causes the data to be applied upon the storage means 84. This latter storage means may comprise a sheet of paper, a tape or the like. Thus, readily intelligible data are again apparent at the receiving end of the communication system by inspecting and reading the message on the storage means 84.

The drive means 90 and 92, controlled by the control means 88, are operated to advance the respective storage means whenever transfer of the data from the storage means 72a to the storage means 84 has taken place.

The transfer of the information from the storage means 72 to the storage means 84 may take many forms. For instance, the sensing means 74 may constitute an electronic scanning tube which is connected to a display device 82 from which an electrostatic image transfer is made onto the tape 84. Alternatively, the sensing means 74 may comprise an optical character reading device which through a translating means actuates a character printing unit 82 to cause the imprinting of readable characters on tape 84. Still further, the units of language in section 72a may comprise negative transparancies adapted to be illuminated from the rear with a high energy source of light, and the tape may be made of light sensitive material. When concurrence is sensed, the control means 88 momentarily energizes the illuminating means, for instance a stroboscopic lamp, and the image from the respective transparency on drum 72 is photographically transferred upon the storage tape or medium 84. In this latter case, the sensing seans 74 comprises optical image transfer means and the printer 82 comprises a photographic apparatus type enclosure through which the storage medium 84 is transported. Any of the above described methods is known in the prior art and may be used in the instant apparatus. The optical-photographic transfer process is believed to be the simplest process and, therefore, may be considered a preferred embodiment.

As will be apparent, the above described communication system is ideally suited, moreover, for translating messages from one language to another language by means of the intermediate code data which act as the common denominator. For instance, the first data, units of language, on drum 22 may be in a first language and the corresponding first data on drum 72 in a second language. While this message interchange by means of the code data in sections **22*b* and 72*b*** will be a word by word translation and will make no allowance for grammatical correctness or syntax, the meaning of the message will, nevertheless, be discernible.

It will be apparent that the above arrangement must include a special mark or word which signifies the condition when after a predetermined time interval a concurrence of sensed data is not established. This provision, although not illustrated, is readily incorporated and is necessary in order to prevent a continuing search for the condition of data concurrence when in fact no such condition will occur.

While there has been described and illustrated a certain preferred embodiment of my invention and several modifications thereof, it will be apparent to those skilled in the art that various further changes and still other modifications may be made therein without deviating from the intent and spirit of this invention, which shall be limited only by the scope of the appended claims.

What is claimed is:

1. A communication system comprising:

a message generation station, a message receiving station, and means for transmitting a message from said generation station to said receiving station;

said message generation station including:

a first storage means having first data associated with units of language and second data related to such units;

sensing means disposed for sensing data associated with units of language provided by a second storage means, for sensing said first data of said first storage means, and for sensing said second data of said first storage means;

recording means coupled to said sensing means for recording on a third storage means data corresponding to said second data of said first storage means;

control means coupled to said sensing means and to said recording means for providing on said third storage means data corresponding to said second data of said first storage means when said sensing means senses concurrence between said first data of said first storage means and said data of said second storage means, whereby said data of said third storage means constitutes the message to be transmitted;

said message receiving station including:

a further first storage means having first data associated with units of language and second data related to such units;

a further sensing means for sensing data provided by a further second storage means and which data constitute the message transmitted, for transferring said first data of said further first storage means, and for sensing said second data of said further first storage means;

a further recording means coupled to said further sensing means for recording on a further third storage means data corresponding to said first data of said further first storage means;

and further control means coupled to said further sensing means and to said further recording means for providing on said further third storage means data corresponding to said transferred first data of said further first storage means when said further sensing means senses concurrence between said second data of said further first storage means and said data of said further second storage means.

2. A communication system as defined in claim 1 wherein said respective first data of said first storage means and of said further first storage means comprise units of language, and wherein said respective second data of said first storage means and of said further first storage means comprise sets of code characters.

3. A communication system as defined in claim 1 wherein said first storage means and said further first storage means comprise rotatable drums, and wherein said respective first data of said first storage means and of said further first storage means comprise printed data constituting units of language.

4. A communication system as defined in claim 1 wherein said respective second data of said first storage means and of said further first storage means are identical.

5. A communication system as defined in claim 1 wherein said first data of said first storage means and said first data of said further first storage means are units belonging respectively to different languages.

6. A communication system as defined in claim 1 wherein said second data of said first storage means and said second data of said further first storage means are identical, and wherein said respective first data are units belonging respectively to different languages.

References Cited

UNITED STATES PATENTS 3,202,761 8/65 Bibbero ------------- 340—146.3

THOMAS A. ROBINSON, *Primary Examiner.*